March 27, 1951  G. E. DATH  2,546,216

FRICTION SHOCK ABSORBER FOR RAILWAY CAR TRUCKS

Filed April 26, 1949  2 Sheets-Sheet 1

Inventor:
George E. Dath.
By Henry Fuchs.
Atty.

March 27, 1951  G. E. DATH  2,546,216
FRICTION SHOCK ABSORBER FOR RAILWAY CAR TRUCKS
Filed April 26, 1949  2 Sheets-Sheet 2
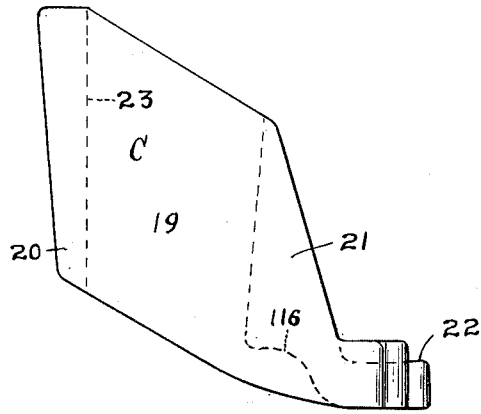
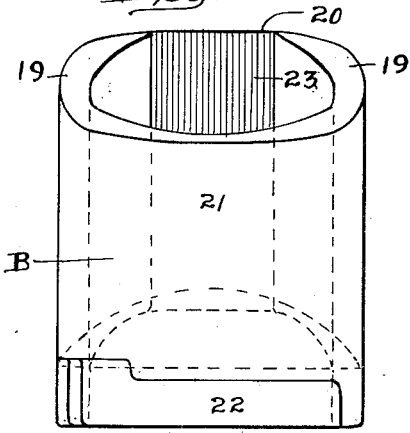
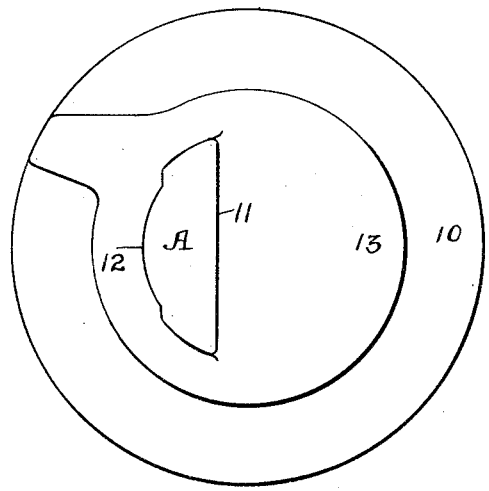
Inventor:
George E. Dath.
By Henry Fuchs
Atty.

Patented Mar. 27, 1951

2,546,216

UNITED STATES PATENT OFFICE 2,546,216

FRICTION SHOCK ABSORBER FOR RAILWAY CAR TRUCKS

George E. Dath, Mokena, Ill., assignor to W. H. Miner, Inc., Chicago, Ill., a corporation of Delaware Application April 26, 1949, Serial No. 89,784

6 Claims. (Cl. 267—9)

This invention relates to improvements in friction shock absorbers especially adapted for use in railway car trucks to snub or dampen the action of the truck springs.

One object of the invention is to provide a friction shock absorber comprising a pair of relatively slidable friction elements, and spring means opposing relative sliding movement of said elements toward each other, wherein means is provided for forcing the friction elements into tight frictional contact with each other and said means is actuated by the spring means which opposes relative movement of said elements.

A further object of the invention is to provide a friction shock absorber comprising a pair of end followers movable toward and away from each other lengthwise of the mechanism, a friction post on each follower projecting toward the other follower and having sliding frictional engagement with the post of the latter, a rocker on one of said followers, engaging the post of the other follower to press said last named post against the other post, and spring means yieldingly opposing relative approach of said followers, wherein said spring means also actuates the rocker to press said posts together.

Other objects of the invention will more clearly appear from the description and claims hereinafter following.

Figure 1:
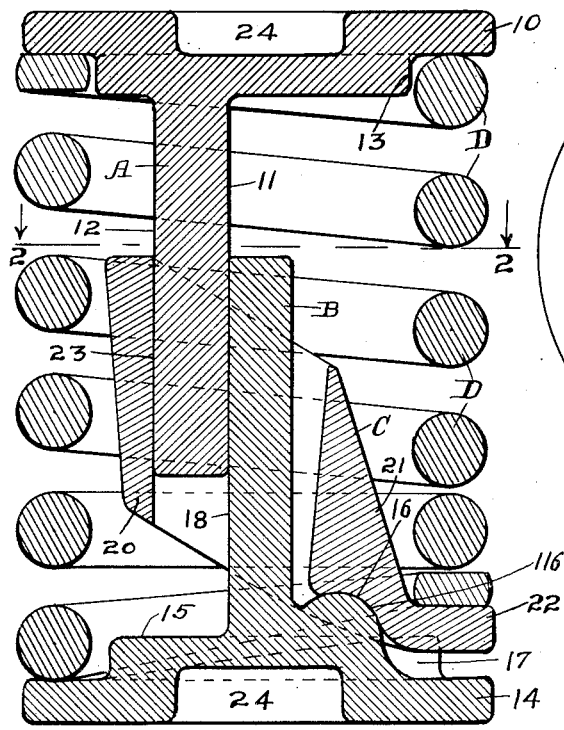
Figure 2:
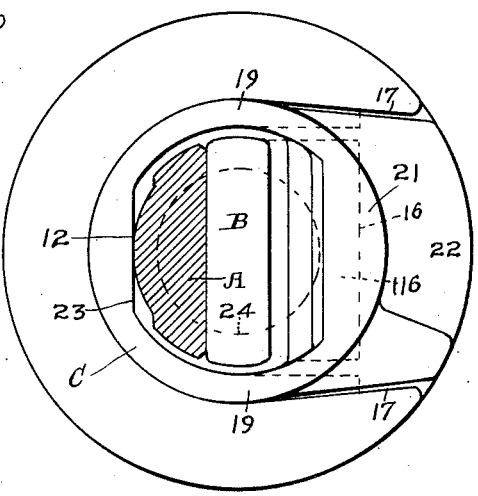
Figure 4:
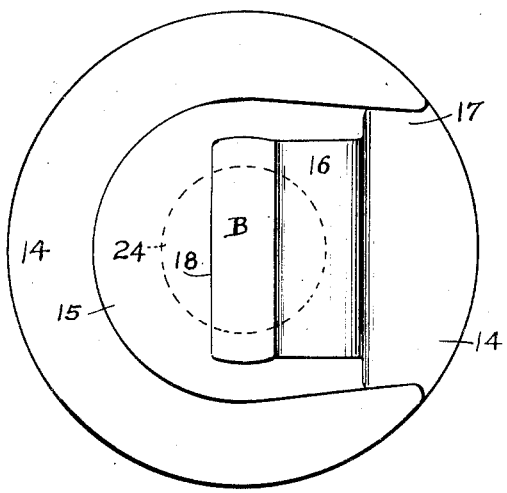
Figure 3:
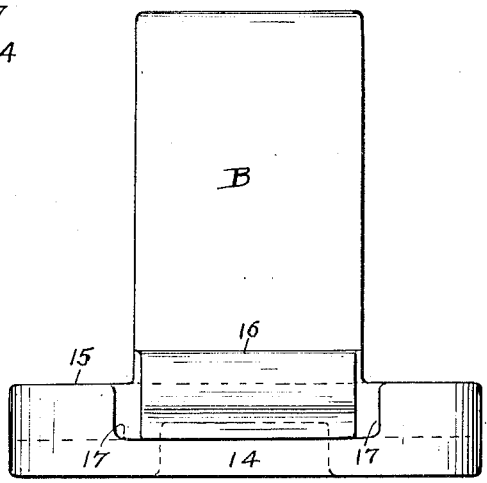

In the accompanying drawings forming a part of this specification, Figure 1 is a transverse, vertical sectional view of the improved shock absorber. Figure 2 is a horizontal sectional view, corresponding substantially to the line 2—2 of Figure 1. Figure 3 is a side elevational view of the lower friction post shown in Figure 1, looking from right to left in said figure. Figure 4 is a top plan view of the lower friction post shown in Figure 1. Figure 5 is an elevational view of the rocker of my improved shock absorber. Figure 6 is a side elevational view of Figure 5, looking from right to left in said figure. Figure 7 is a bottom plan view of the upper friction post shown in Figure 1.

My improved shock absorber, as illustrated in the drawings, comprises broadly a top friction post A, a bottom friction post B, a rocker C for pressing the posts against each other, and a spring D yieldingly opposing relative lengthwise movement of the posts toward each other and actuating said rocker.

The top post A is formed integral with a disclike follower plate 10 from which the post depends. The post A is disposed at one side of the central vertical axis of the device, that is, to the left of said axis, as shown in Figure 1, and has a lengthwise extending flat friction surface 11 on its inner side. The longitudinally extending outer surface of the post A is preferably transversely rounded, as indicated at 12, in Figure 2. The follower plate 10 has a depending, cylindrical boss 13 on the bottom side, which forms the base of the post A and extends into the upper end of the spring D.

The bottom friction post B carries a disclike follower plate 14 at its base, which plate is formed integral therewith. The follower plate 14 of the post B is opposed to the plate 10 and corresponds to the latter in size. The follower plate 14 is provided with an upstanding cylindrical boss 15 at its upper side, which forms the base of the post B. At the right hand side of the device, as seen in Figures 1, 2, and 4, the boss 15 has a raised, transversely extending, convex bearing projection 16 on which the rocker C is pivotally supported, and the boss 15 is cut away below said bearing projection, as indicated at 17, to provide clearance for swinging movement of the rocker C. The post B has a lengthwise extending, flat friction surface 18 on its inner side in sliding engagement with the surface 11 of the post A.

The rocker C is in the form of a yokelike member embracing the posts A and B and is swingingly supported on the bottom follower plate 14. The yokelike rocker C comprises laterally spaced, outwardly bowed side arms 19—19 and inner and outer, transverse end sections 20 and 21 connecting the arms 19—19. At the bottom of the section 21, the rocker C is provided with a concave bearing seat 116, which is engaged over the bearing projection 16 of the follower plate 14. Extending outwardly from the lower end of the rocker C, at the end section 21 thereof, is a horizontally disposed follower flange or arm 22 upon which the lower end of the spring D is adapted to bear. The section 20 of the yokelike rocker C presents a vertically extending, transversely disposed, flat bearing face 23 on its inner side, which is in bearing contact with the transversely rounded, outer face 12 of the post A.

The spring D is in the form of a helical coil surrounding the posts A and B, having its top end bearing on the follower plate 10 of the post A and its bottom end bearing on the follower plate 14 of the post B at the left hand side of the device and on the flange 22 of the rocker C at the right hand side of the same. This spring thus yieldingly opposes movement of the posts A and B and their follower plates 10 and 14 toward each other, and further yieldingly presses the rocker C against the post A to force the latter against the post B.

My improved shock absorber replaces one or more of the spring units of a truck spring cluster of a railway car, being interposed between the usual top and bottom spring plates, which cooperate with the cluster. In order to accommodate the usual centering projections of the spring plates of the spring cluster, the follower plates 10 and 14 of my improved shock absorber are preferably provided with outwardly opening, central seats 24—24.

The operation of my improved shock absorber is as follows: Upon the spring cluster of the truck of a railway car being compressed between the follower plates of said cluster, my improved shock absorber, which is disposed between said follower plates, is compressed therewith, thereby forcing the post A downwardly against the resistance of the spring D, sliding the post A on the post B. Inasmuch as the posts A and B are positively forced together by the spring actuated rocker C, the required frictional resistance is developed to effectively snub the action of the truck springs.

I claim:

1. In a friction shock absorber, the combination with a pair of friction posts, relatively lengthwise movable toward and away from each other, said posts having sliding frictional contact with each other; of spring means between said posts yieldingly opposing relative lengthwise movement of said posts with respect to each other; and a pressure transmitting member pivotally connected to one of said posts, engaging the other post, and also engaged and actuated by said spring means for pressing the posts into tight frictional contact with each other.

2. In a friction shock absorber, the combination with a pair of friction posts, relatively lengthwise movable toward and away from each other, said posts having sliding frictional contact with each other; of spring means between said posts yieldingly opposing relative lengthwise movement of said posts with respect to each other; and a rocking member swingingly connected to one of said posts, engaging the other post, and also engaged and actuated by said spring means for pressing the posts into tight frictional contact with each other.

3. In a friction shock absorber, the combination with a pair of friction posts, relatively lengthwise movable toward and away from each other, said posts having sliding frictional contact with each other; of spring means between said posts yieldingly opposing relative lengthwise movement of said posts with respect to each other; and a rocking yoke member embracing said posts and swingingly connected to one of said posts, engaging the other post, and also engaged and actuated by said spring means for pressing the posts into tight frictional contact with each other.

4. In a friction shock absorber, the combination with a friction post; of a second friction post, said posts having lengthwise extending friction surfaces on their inner sides in contact with each other; a rocker pivotally connected to said second named post and bearing on the outer side of the first named post; spring means between said posts yieldingly opposing relative lengthwise movement of said first and second named posts with respect to each other, said spring means also engaging and pressing said rocker against said first named post to force the latter into tight frictional engagement with the second named post.

5. In a friction shock absorber, the combination with an end follower; of a second end follower, said followers being relatively movable toward and away from each other lengthwise of the mechanism; a friction post on said first named follower extending toward the other follower, said post having a lengthwise extending friction surface on its inner side; a second friction post on said second named follower extending toward said first named follower and having a friction surface on its inner side in sliding engagement with the friction surface of said first named post; a rocker swingingly connected at one end to said first named follower and having the other end bearing on the outer side of said second named post; and spring means bearing at opposite ends on said followers, said spring means also bearing on said rocker and urging the same to swing toward said second named post.

6. In a friction shock absorber, the combination with an end follower; of a second end follower, said followers being relatively movable toward and away from each other lengthwise of the mechanism; a friction post on said first named follower extending toward the other follower, said post having a lengthwise extending friction surface on its inner side; a second friction post on said second named follower extending toward said first named follower and having a friction surface on its inner side in sliding engagement with the friction surface of said first named post; a rocker pivotally supported at one end for swinging movement on said first named follower at the outer side of said first named post, said rocker having a portion at the other end bearing on the outer side of said second named post; a follower arm on said rocker outwardly of the point of pivotal support thereof; and a coil spring surrounding said posts and bearing at one end on said first named follower and the follower arm of said rocker, and at the other end on said second named follower.

GEORGE E. DATH.

REFERENCES CITED

The following references are of record in the file of this patent:

UNITED STATES PATENTS

| Number | Name | Date |
| --- | --- | --- |
| 1,169,863 | Peycke | Feb. 1, 1916 |
| 1,644,391 | Mitchell | Oct. 4, 1927 |
| 2,426,684 | Haseltine | Sept. 2, 1947 |